Nov. 30, 1965 T. D. COE 3,220,471

HEAT TRANSFER

Filed Jan. 15, 1963

INVENTOR.
THOMAS D. COE
BY
Ezekiel Wolf, Wolf & Greenfield
ATTORNEYS

United States Patent Office 3,220,471

Patented Nov. 30, 1965

3,220,471

HEAT TRANSFER

Thomas D. Coe, Winchester, Mass., assignor to Wakefield Engineering Co., Inc., Wakefield, Mass., a corporation of Massachusetts Filed Jan. 15, 1963, Ser. No. 251,590
5 Claims. (Cl. 165—121)

This invention relates in general to heat transfer and more particularly to means for efficiently cooling semiconductor devices. Heat transfer means according to the invention is relatively easy and inexpensive to fabricate while providing a relatively large surface area to facilitate efficient and rapid heat transfer.

Since the development of semiconductors and other related electronic power devices, the ancillary apparatus required to cool such devices rather than the devices themselves, constitute the limiting factor in the size miniaturization of much electronic circuitry. One solution to this problem is found in United States patent application S.N. 117,367, filed June 15, 1961, now Patent Number 3,149,-666, granted September 22, 1964. An efficient cooler is disclosed having sectorial members which maximize the cooling efficiency of cooling devices at a given volume of blower capacity, thus enabling the use of smaller cooling devices to achieve certain temperature conditions.

The coolers disclosed in the above-noted patent application are extremely efficient. However, they are restricted to certain predetermined radial dimensions when formed by known extrusion techniques. Generally, these coolers have parallel fins oriented about means defining an inner wall, such as a tube. The fins of adjacent sectorial sections are each individually extruded along with a base for each section. It is well known that extrusion techniques are such that the fins cannot be extruded having radial lengths above certain maximum values, depending upon the particular materials employed. If the radial length of the fins exceeds certain preset values, inherently, nonuniform thickness fins will be formed by extrusion.

Accordingly, it is an important object of this invention to provide relatively compact heat transfer means having relatively large surface areas to allow efficient and rapid heat transfer while being relatively easy and inexpensive to fabricate.

It is another important object of this invention to provide a heat transfer means in accordance with the preceding object which allows convenient, easily accessible mounting of devices to be cooled in positions such that efficient cooling is obtained.

It is a further important object of this invention to provide an extruded thermally conductive element for a modular cooling device which may have larger radial dimensions then previously known and thus may be tailored to a relatively wide range of applications.

According to the invention, sectorial heat transfer elements are composed of materials having low thermal resistance. Each element is an integral extruded unit and has a longitudinally extending base adapted to form a portion of the perimeter of a circularly arranged group of similar elements. An extension of the base forms a trunk which extends radially inwardly on one side of the base while a semiconductor mounting means is located on an outer side of the base. Longitudinally arranged fins are provided extending from the trunk. In a preferred form of the invention, the trunk varies inversely in thickness from the base to its free end.

The ratio of fin area exposed to the air or other heat transfer medium in modular units in which the elements are used, is very high. Still another feature of the invention resides in its formation as a unitary structure by extrusion to insure good thermal contact among the different portions of the device while reducing fabrication problems, costs and time.

Other features, objects and advantages of the invention will be better understood and appreciated from the following detailed description of one embodiment thereof selected for purposes of illustration and shown in the accompanying drawing, in which.

Figure 1:
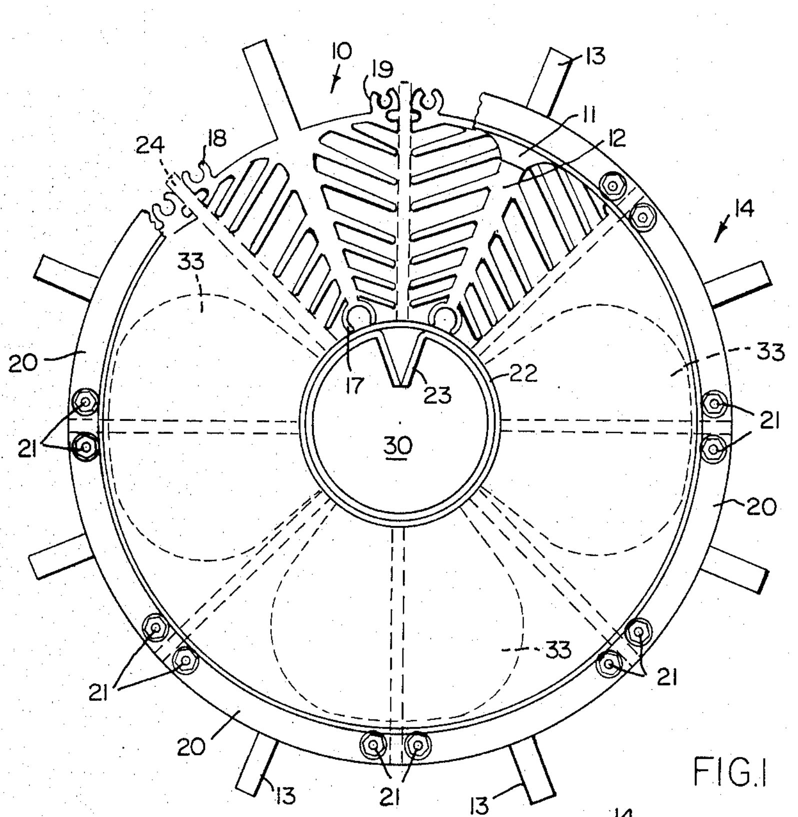
FIG. 1 is a front-plan view of a group of elements of this invention mounted in a modular unit.
Figure 2:
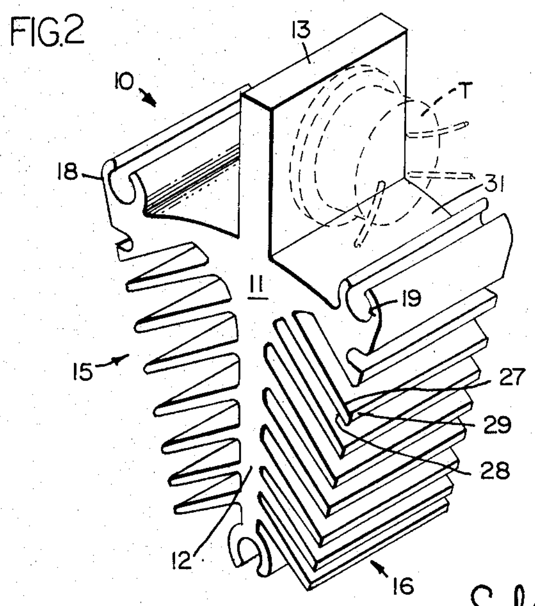
FIG. 2 is a perspective view of an individual element thereof showing an attached semiconductor.

With reference now to the drawing and particularly FIGS. 1 and 2, a modular cooling assembly 14 is shown containing eight heat transfer elements 10 of the present invention. Preferably the modular cooler assembly 14 is identical to the cooler disclosed in the previously mentioned patent application with the exception that the elements 10 of the present invention are substituted for the previously used elements.

Preferably the elements 10 have constant cross-sectional dimensions throughout their length and are composed of aluminum although other metals having high heat conductivity may be used, such as copper, copper alloys and aluminum alloys. Such metals may be extruded by conventional techniques to form integral heat transfer elements 10 having uniform preselected dimensions.

Transistors such as T may be mounted directly on an arcuate surface 31 of each element 10. However, it is preferred to provide an integral semiconductor mounting flange 13 extending outwardly of the arcuate surface 31, coextensively with a base 11 and in the same plane as an inwardly extending trunk 12. The mounting flange 13 is adapted to have a semiconductor T as shown in dotted outline in FIG. 3 mounted thereon by conventional mounting means such as bolts or clips affixed to flange 13.

Side edges of the base 11 carry outwardly projecting, elongated split rings 18 and 19. The split rings 18 and 19 are dimensioned to receive bolts 21 when the elements 10 are mounted in the modular assembly 14. The trunk 12 is integrally connected to the base 11 and extends radially inwardly from the inner side of the base. The free end of trunk 12 is preferably formed into a split ring 17 similar to split rings 18 and 19. The split ring 17 is adapted to grip an inner tubular member 22 when the element 10 is placed in modular assembly 14. The split ring 17 aids in positioning the tubular member 22 in relation to the element 10 in the assembly 14.

Preferably the trunk 12 varies in thickness along its radial length and this variation is inversely proportional to the length of the trunk from the base 11. The trunk 12 lies in a radial plane bisecting the arc formed by arcuate surface 31 and extends longitudinally of the axis 30 of the modular cooler assembly 14 for the same axial distance as the base 11.

Two sets of fins 15 and 16 are symmetrical with each other and extend angularly from the trunk 12. Each of fins 15 and 16 has an upper planar surface 27 and a lower planar surface 28 which taper towards each other from the trunk 12 to a preferably rounded tip 29. In some of the embodiments of the invention T-shaped tips may be employed to increase surface contact area of the fins. Tips 29 of fins 16 preferably lie in a radial plane extending from the axis 30 of the modular cooler assembly 14 in which the elements 10 are located. Similarly, tips 29 of fins 15 lie in second radial plane as previously described. The tips 29 of fins 15 and 16 along with arcuate surface 31 define a portion of a sector of a circle.

Passageways or spaces 32 lie between each of the fins permitting uninterrupted passage of cooling fluids. In the preferred form of the invention, each arcuate surface 31 defines an arc of slightly less than 45° with each element 10 containing eight fins on either side of the trunk 12 thereby providing large fin surface areas for transfer of heat to fluid mediums forced through passageways 32.

Figure 3:
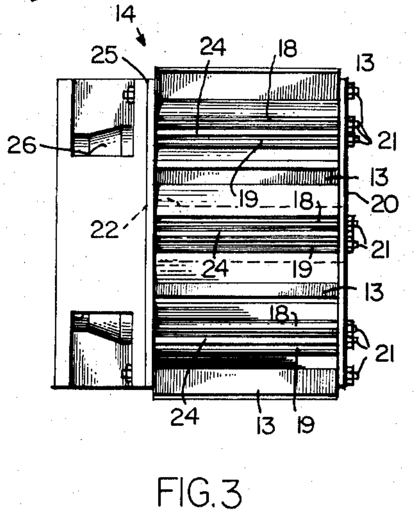
FIG. 3 is a side view of the assembly shown in FIG. 1.

In the modular cooler assembly 14, eight elements 10 are sectorially arranged about the insulating tube 22. Substantially planar radially extending insulating partitions 24 space each of the elements 10 from each other. It is a function of the partition 24 and tube 22, to electrically isolate each element from every other element of the assembly 14. This feature prevents electrical interference between transistors placed on different mounting flanges 13 of each element 10. Bolts 21 extend between and clamp insulating rims 20 and 25 to lock the elements 10 in position. The rim 25 is affixed by conventional means to the housing of fan 26 as best shown in FIG. 3 where bolts 21 are mounted directly to the fan housing. The fan 26 is positioned at the rear of the assembly 14 as shown in FIG. 3 with a hub 23 closing a rear end of the passageway formed by tube 22. Fan blades 33 extend outwardly of the tube 22 to the inner edge of rim 25. The fan blades 33 may be of conventional design and preferably comprise 4 ear-shaped blades which are adapted to direct air or other cooling medium through the passageways 32 between fins of the elements 10. Thus, tube 22 additionally acts as a cooling fluid directional member to increase efficiency of the fan by preventing air flow other than in contact with the fins 15 and 16.

It is a feature of this invention that the air or other cooling medium circulated by the fan 26 is directed solely through the passageways 32 maximizing the efficiency of the fan and allowing the air to have an uninterrupted flowpath through the passageways 32. Planar surfaces 27 and 28 of each fin are located so as to be perpendicular to a plane drawn through the fan blades 33 thereby enhancing the noninterrupted flow of air about the fins.

It is another feature of this invention that each of the semiconductor mounting flanges 13 extend outwardly of each element 10 in substantially the same radial plane as each trunk 12. This feature enables semiconductors to be mounted on the flange in positions allowing the shortest possible distance between the semiconductors and fins of each member 10. This feature also allows some heat to be dissipated into the atmosphere surrounding the assembly, thereby increasing the heat transfer rate from the semiconductors.

It is evident that those skilled in the art may now make numerous modifications of and departures from the specific embodiments described herein without departing from the inventive concept. For example, the fin size and the number of fins may be varied as may the size and configuration of the base 11 and trunk 12. Varying numbers of fins or elements in the assembly may be provided. More than one semiconductor may be mounted on each flange 13 if desired. Alternatively the axial length of one or more of elements 10 may be shortened. In this case, a second element may be axially aligned with the first element which has been shortened and an insulating spacer placed between the bases of each element, thereby providing two insulated heat transfer elements in a single sector of the assembly 14.

Consequently the breadth of this invention is to be construed as limited only by the spirit and scope of the appended claims.

What is claimed is:

1. A heat transfer assembly comprising a plurality of elongated extruded elements each extending side by side about an elongated central passageway and embraced by a circular sector emanating from the axis of said passageway,
each element including a base and a trunk located substantially centrally of said base and extending inwardly towards said passageway from a side of said base with a plurality of spaced heat transfer fins extending from and on either side of said trunk with the free ends of said fins of each element being in substantially abutting relationship with the free ends of the fins of an adjacent element,
said base and ends of said fins defining said circular sector,
means for retaining said elements about said passageway,
means integrally attached to selected ones of said bases for individually mounting and carrying a device on the sides of said bases opposite said trunk base sides,
and fan means for directing a coolant between said bases and said passageways along said fins.

2. A heat transfer assembly in accordance with claim 1 wherein the trunk of each element tapers from a first thickness near its base to a second lesser thickness near said passageway.

3. A heat transfer assembly in accordance with claim 1 wherein said mounting means comprises a substantially planar flange integral with ones of said selected bases.

4. A heat transfer assembly in accordance with claim 1 wherein each of said elements have substantially the same cross-sectional dimensions throughout their length and means are provided electrically insulating said elements from one another.

5. A heat transfer assembly in accordance with claim 4 wherein said fins extend from each trunk at an acute angle therefrom.

References Cited by the Examiner

UNITED STATES PATENTS

| | | | |
|---|---|---|---|
| 2,999,971 | 9/1961 | Schnecke | 317—100 X |
| 3,149,666 | 9/1964 | Coe. | |

FOREIGN PATENTS

| | | |
|---|---|---|
| 836,401 | 6/1960 | Great Britain. |

CHARLES SUKALO, *Primary Examiner*.